H. N. JOHNSTON.
Gleaner and Binder.
No. 235,775. Patented Dec. 21, 1880.
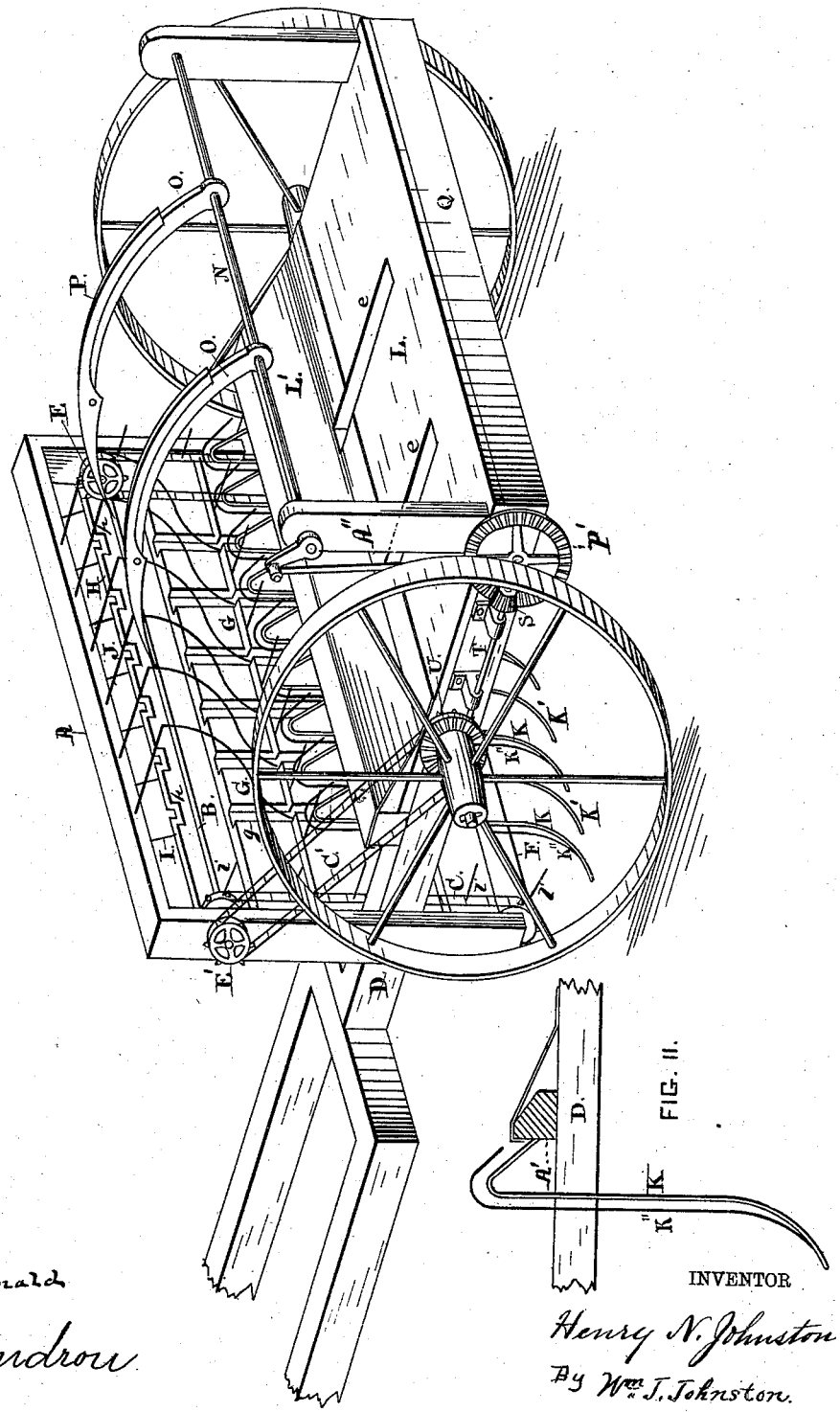
WITNESSES
J. H. McDonald
J. L. Coudrou
INVENTOR
Henry N. Johnston
By Wm. J. Johnston.
ATTORNEY

UNITED STATES PATENT OFFICE.

HENRY N. JOHNSTON, OF BROCKPORT, NEW YORK.

GLEANER AND BINDER.

SPECIFICATION forming part of Letters Patent No. 235,775, dated December 21, 1880.

Application filed February 21, 1880.

*To all whom it may concern:*

Be it known that I, HENRY N. JOHNSTON, a citizen of the United States, residing at Brockport, in the county of Monroe and State of New York, have invented certain new and useful Improvements in Gleaners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of machines in which cut grain is gleaned from the ground and carried to a platform, where it may be bound by suitable mechanism and the sheaf then thrown to the ground; and it consists in a series of gleaning-teeth secured to a head resting on the frame of the machine, and a set of elevating-teeth attached to bars on an endless chain, a series of clearers, a grooved partition suitably fastened in guide-posts on the frame, and a pair of binding-arms moving through slots in the platform of the machine; and, lastly, in details of construction hereinafter more fully described, and pointed out in the claims.

In the drawings, Figure 1 is a perspective view of my machine, and Fig. 2 a detail view of one of the gleaning-teeth and the manner of its attachment to head A'.

A main frame, D, mounted on wheels, supports the working parts of the machine. At the front of the machine, and supported by frame D, is a rectangular frame, A, which has seated in it, near its top, a shaft, B, and at its lower end a roller, F, over which pass the chains C. Between the shaft B and roller F is interposed a grooved partition, G, secured to the sides of the frame, and around which the rake-bars H move.

The shaft B has secured to and moving with it at each end a sprocket-wheel, E, for moving the endless chains C, which have attached to them rake-bars H, provided with elevating-teeth. The chains themselves are also provided with elevating-teeth $i$. The shaft B is actuated by a sprocket-wheel, over which passes a chain, C', to a sprocket-wheel on the hub of the driving-wheel; or it may be operated in any other suitable manner.

Attached to a rake-head, A', resting on frame D is a set of gleaning-teeth, K K'. These teeth may be made of a single piece of metal, bent as shown, or with an auxiliary tooth, K'', united to the main tooth at its point or lower end, leaving the upper end free, for purposes that will be hereinafter explained. This form of gleaning-tooth is shown more fully in Fig. 2. The gleaning-teeth may, if desired and deemed preferable, all be made in this way. The teeth are sufficiently near the ground to gather the grain, which, as it accumulates, is elevated by the elevating-teeth on the rake-bars H and chains, the rake-bars H being provided with the U-shaped projections $h$. As the grain is carried upward on the elevating-teeth it is confined between the partition G and the gleaning-teeth, and by being thus confined is partially compressed into a gavel. When it reaches the top of the gleaning-teeth the projections on the rake-bars pass beneath the points of the clearer-teeth J, resting in grooves $g$ of the partition, (the ends of said teeth being slightly curved outward for that purpose,) and is forced out by the clearer-teeth over the curved tops of the gleaner-teeth and dropped on a gavel-board, L', of the platform, where it is seized by the arms P and moved to the rear of the platform.

By using two binding-arms the sheaf may be bound at each end and a lighter cord or wire used than when a single binding-arm and a single central cord are used, and the bind or strain of the cord or wire on the sheaf be reduced, and the sheaf is more easily handled. In this case but a single turn and twist is absolutely necessary to be given to the binding-cord, while in the single binding-arm a stronger cord is necessary, and generally two or more twists given to the binding cord or wire.

The clearer-teeth are preferably made flexible, and are secured to the top of frame A, and extend outwardly from the frame, and are then inclined downward and curved inward, so that points rest in grooves $g$ of the partition. The auxiliary teeth K'', being united with the teeth K at their points and free at their tops, operate as springs, and readily adapt themselves to the grain carried upward between the teeth and the partition, so that when the grain is heavy they will be forced back toward the main teeth, and when light will spring outward and confine the grain closely against the partition.

N is a shaft mounted on standards A'', located at the rear of the platform, upon which are mounted the arms O, having the pivotal points P. This shaft is actuated by a crank-arm, Q, and crank-rod Q', attached to a bevel-gear wheel, P', whereby it is given a reciprocating motion. This bevel-gear wheel is operated by a pinion, S, on a shaft, T, having at its opposite end another gear-wheel on the hub of the driving-wheel, and the several gear-wheels and pinions are adjusted to regulate the movement of shaft N, so that the machine will pass over the ground a sufficient distance to gather a suitable-sized gavel while the shaft N and arms O are making one rotary movement.

I am aware that hay-loading machines have been made with endless chains provided with carrier or elevating teeth, a revolving clearer, and double gleaning-teeth. I am also aware that gleaners and binders have been made with an endless belt having elevating-teeth secured thereto, and such forms of construction I do not claim; but What I do claim is—

1. In a gleaner and binder, the combination of a series of clearer-teeth, J, secured to frame A, and resting in grooves of partition G, with the rake-bars H, having U-shaped projections h, and attached to and actuated by endless chains C, driven by sprocket-wheels E E', substantially as described, and for the purpose set forth.

2. In a gleaner and binder, the combination of a shaft, B, and rake-bars H, attached to endless chains, with a vertical partition, G, secured to main frame A, and grooved to receive the projections h of the rake-bars, and the curved ends of the clearer-teeth, substantially as described, and for the purpose set forth.

3. In a gleaner and binder, the combination, with a series of spring gleaning-teeth and a series of spring clearer-teeth entering into grooves of a partition, G, of a set of rake-bars attached to endless chains and provided with projections entering the grooves of the partition, which projections pass under the curved points of the clearer-teeth as the grain is carried up by the rake-bars, substantially as described.

In testimony whereof I affix my signature in presence of two witnesses.

HENRY N. JOHNSTON.

Witnesses:
C. F. HAMLIN,
F. E. WILLIAMS.